(12) United States Patent
Whitworth

(10) Patent No.: US 6,241,892 B1
(45) Date of Patent: Jun. 5, 2001

(54) METHOD OF REDUCING THE CONTAMINATION LEVEL OF A SOLVENT PURIFICATION SYSTEM, AND SUCH SOLVENT PURIFICATION SYSTEM

(75) Inventor: Thomas M. Whitworth, Socorro, NM (US)

(73) Assignee: NM Tech Research Foundation, Socorro, NM (US)

( * ) Notice: Subject to any disclaimer, the term of this patent is extended or adjusted under 35 U.S.C. 154(b) by 0 days.

(21) Appl. No.: 09/106,962

(22) Filed: Jun. 29, 1998

(51) Int. Cl.[7] .................................................. B01D 61/00
(52) U.S. Cl. .......................... 210/650; 210/649; 210/653; 210/767; 210/257.2; 210/295.1; 210/641; 204/518
(58) Field of Search ..................................... 210/650, 651, 210/257.2, 195.2, 641, 321.6, 767, 768, 295, 653, 346, 649; 204/518

(56) References Cited

U.S. PATENT DOCUMENTS

| | | |
|---|---|---|
| 3,839,206 * 10/1974 | Welch | 210/259 |
| 4,244,506   1/1981 | Stokes, Jr. et al. | 210/652 |
| 4,284,492   8/1981 | Karn . | |
| 4,752,363   6/1988 | Buckley et al. | 204/101 |
| 4,806,244   2/1989 | Guilhem | 210/638 |
| 4,964,987 * 10/1990 | Johnson | 210/346 |
| 5,112,489 *  5/1992 | Hartmann | 210/637 |
| 5,118,423   6/1992 | Astegger et al. | 210/638 |
| 5,158,681  10/1992 | Freeman et al. | 210/641 |
| 5,238,574   8/1993 | Kawashima et al. | 210/652 |
| 5,403,490 *  4/1995 | Desai | 210/652 |
| 5,501,798 *  3/1996 | Al-Samadi et al. . | |
| 5,853,593 * 12/1998 | Miller . | |
| 5,858,240 *  1/1999 | Twardowski et al. | 210/652 |
| 5,888,401 *  3/1999 | Nguyen | 210/651 |
| 5,997,753 * 12/1999 | Ter-Stepanian . | |

\* cited by examiner

Primary Examiner—Ana Fortuna

(57) ABSTRACT

A solvent purification system and method of reducing the contamination level thereof are provided. Contaminated solvent is directed under pressure across at least one cross-flow membrane unit, and the waste stream therefrom is conveyed through at least one membrane precipitator unit to precipitate out contaminant, or selectively precipitate out solutes.

20 Claims, 6 Drawing Sheets

METHOD OF REDUCING THE CONTAMINATION LEVEL OF A SOLVENT PURIFICATION SYSTEM, AND SUCH SOLVENT PURIFICATION SYSTEM

BACKGROUND OF THE INVENTION

The present invention relates to a method of reducing the contamination level of a solvent purification system, and hence the volume of a waste stream. The invention also relates to such a solvent purification system.

A major problem with conventional cross-flow membrane units, such as cross-flow reverse osmosis, ultafilteration, and electrodialysis units, for example to remediate contaminated water or some other solvent, is the relatively large waste stream (for example approximately 40–60% of the total volume through the unit is a waste stream) that is generated and for which disposal is expensive.

A number of processes for treating solute-containing solvents are known. For example, U.S. Pat. No. 5,403,490, DESAI, discloses the use of a reverse osmosis unit, but cannot handle high solubility solutes and is suitable only for metals and some organic materials. The process of this patent also has a limited practicality because the process encourages fouling of the reverse osmosis unit. U.S. Pat. No. 5,158,681, Freedman et al, provides a reverse osmosis unit, but does not provide for treatment of the waste stream therefrom. U.S. Pat. No. 5,118,423, Astegger et al, again provides a reverse osmosis unit, but is not concerned with treating the waste stream therefrom. U.S. Pat. No. 5,238,574, Kawashima et al, discloses two reverse osmosis units and an evaporating device. U.S. Pat. No. 4,752,363, Buckley et al, discloses a cross-flow filtration process, along with the use of a filter. U.S. Pat. No. 4,284,492, Karn, provides a reverse osmosis electrodialysis system, and teaches how to prevent precipitation. U.S. Pat. No. 4,806,244, Guilhem, provides a sorption process to selectively remove ions from an aqueous stream. Finally, U.S. Pat. No. 4,244,506, Stokes, Jr. et al, discloses use of a cross-flow reverse osmosis unit in conjunction with a filter. None of these known devices successfully reduces the volume of a waste stream exiting a reverse osmosis unit.

It is therefore an object of the present invention to provide an improved method and system to reduce the contamination level of a solvent purification system and to thus reduce the volume of the waste stream from a cross-flow membrane unit.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
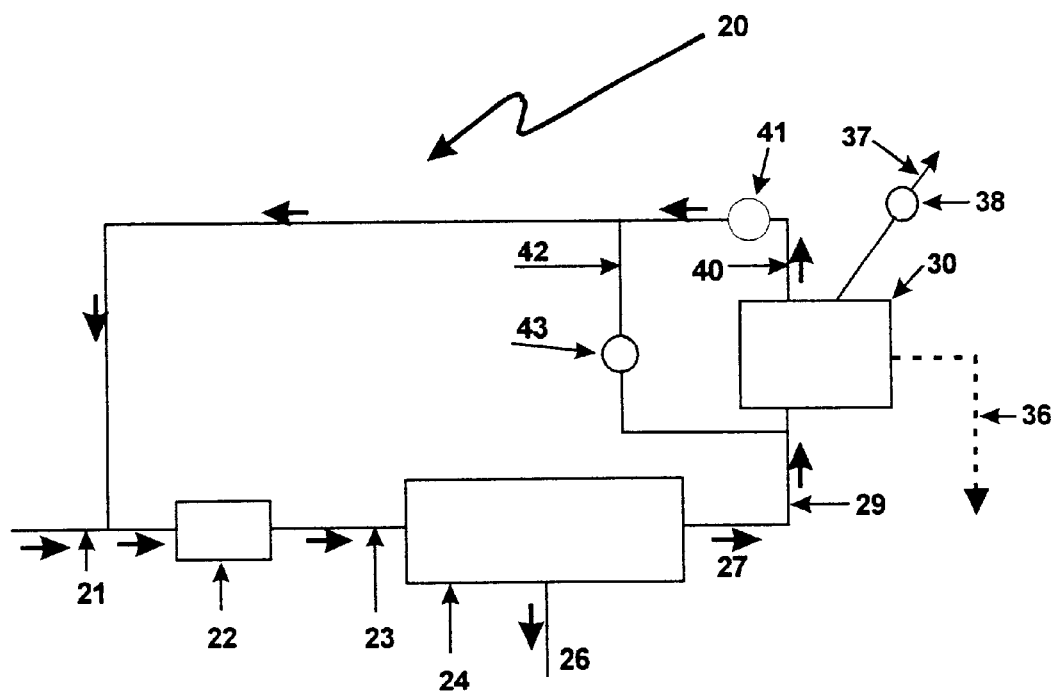
FIG. 1 illustrates a first exemplary embodiment of the inventive solvent purification system, and shows a cross-flow membrane unit followed by a membrane precipitator unit.

Pursuant to the method of the present invention, contaminated solvent is directed under pressure across at least one cross-flow membrane unit, and the waste stream therefrom is conveyed through at least one membrane precipitator unit to precipitate out contaminant. Thus, the solvent purification system of the present invention comprises at least one cross-flow membrane unit for receiving contaminated solvent, and at least one membrane precipitator unit for receiving a waste stream from the membrane unit.

Pursuant to one preferred specific embodiment of the present invention, in order to achieve a desired level of contamination reduction of the waste stream from the cross-flow membrane unit, at least some of the effluent stream from the membrane precipitator unit is recirculated back to the cross-flow membrane unit. Precipitated-out contaminant from the membrane precipitator unit is removed, either periodically or continuously.

With the method and solvent purification system of the present invention, a waste stream volume reduction of as much as three to four orders of magnitude (up to 10,000%) can be achieved.

Further specific features of the present invention will be described in detail subsequently.

DESCRIPTION OF PREFERRED EMBODIMENTS

While the various features of this invention are hereinafter illustrated and described as providing a method and system for purifying water and/or producing purified solids from solution, for example in conjunction with cleaning up rinse water or waste streams, or with the desalination of water, using a reverse osmosis unit, and in particular a cross-flow reverse osmosis unit, in conjunction with a membrane precipitator unit, it is to be understood that the various features of this invention can be utilized for reducing or eliminating the solutes or contamination not only in water, but also in any other solvent. Therefore, this invention is not to be limited to only the embodiments illustrated in the drawings because the drawings are merely utilized to illustrate one of the wide variety of uses of this invention.

Referring now to the drawings in detail, the solvent purification system of this invention is generally indicated by the reference numeral 20 in the embodiment illustrated in FIG. 1, which will be discussed in conjunction with the desalination of water. However, as indicated above, the system can be used to purify or at least reduce the contamination of, for example, rinse water or other solute-containing solvent. Although for the sake of discussion the solute is indicated as being dissolved in the solvent, the solute could either be partially or entirely dissolved in the solvent, could be in colloidal form, or could be present as a suspension.

Figure 2:
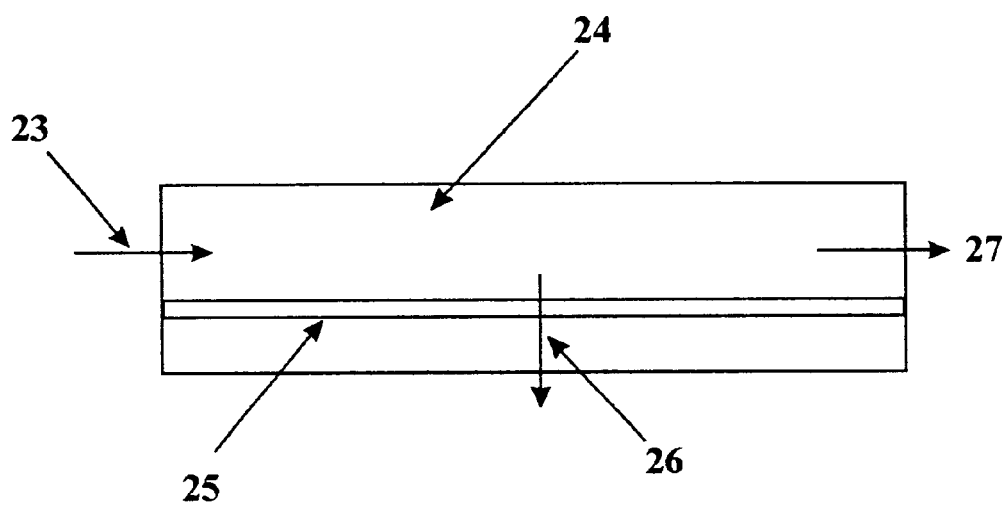
FIG. 2 is a detailed view of a cross-flow reverse osmosis unit that can be used in the system of FIG. 1.

Solution is input into the solvent purification system 20 via the line or conduit 21 either from a constant stream or from a tank or similar container. The solution, such as salt water, waste water, or rinse water from an industrial process, is then introduced via the pump 22, or by gravity feed, and via the line 23, into the cross-flow membrane unit 24, such as a reverse osmosis, electrodialysis, or ultrafiltration unit. In the illustrated embodiment, the unit 24 is a conventional cross-flow reverse osmosis unit, which is shown in greater detail in FIG. 2. The cross-flow reverse osmosis unit 24 (such as of a flat leaf, spiral wound, or tubular configuration) comprises a membrane 25, for example made of a synthetic polymer. Solution is introduced to the reverse osmosis unit 24 via the line 23 under pressure, for example in a range of from 10 to 10,000 psi, and probably at 200 to 1,000 psi, depending upon the osmotic efficiency of the membrane. The solution is directed across the membrane 25 parallel or at least substantially parallel thereto and preferably in a turbulent fashion. Such a turbulent flow is designed to prevent a solute concentration increase or build up near the surface of the membrane 25, which would decrease the solute separation efficiency of the membrane. The membrane 25 allows some of the solution, as the most purified portion exiting the reverse osmosis unit 24, to exit as the permeate or solvent stream 26, to pass through. In the case of salt water, up to 99.8% removal of NaCl can be achieved, so that essentially purified water leaves the cross-flow reverse osmosis unit 24 as the solvent stream 26. The degree of purification of a solvent can be controlled by appropriate selection of the membrane 25, and selective removal of solutes contained in the solution that is passed across the reverse osmosis unit 24 can also be achieved.

Figure 3:
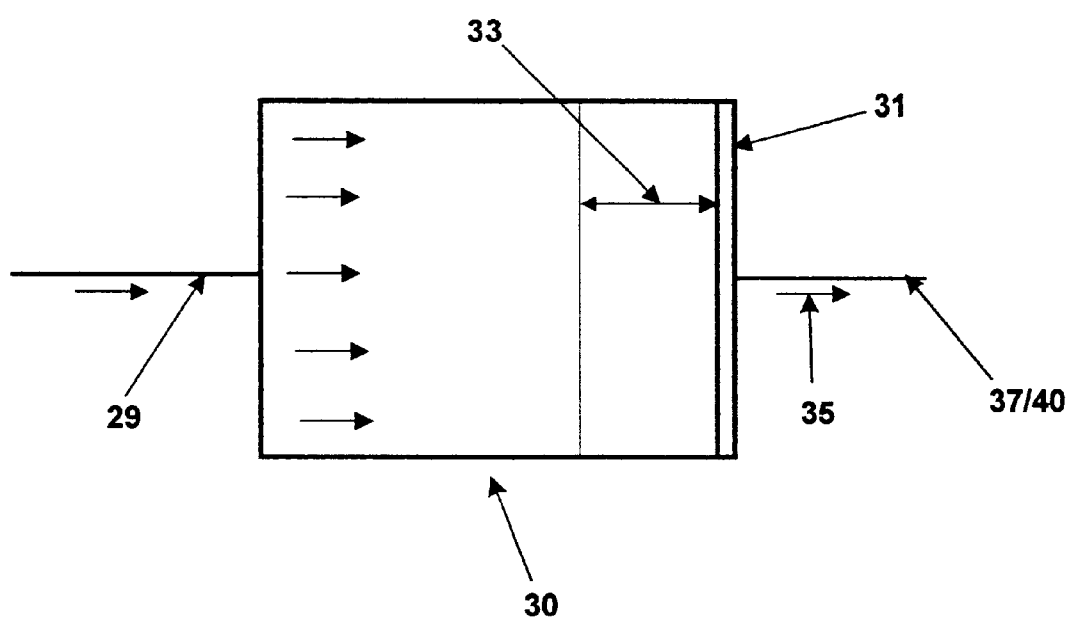
FIG. 3 is a detailed view of a membrane precipitator that can be used in the system of FIG. 1.
Figure 4:
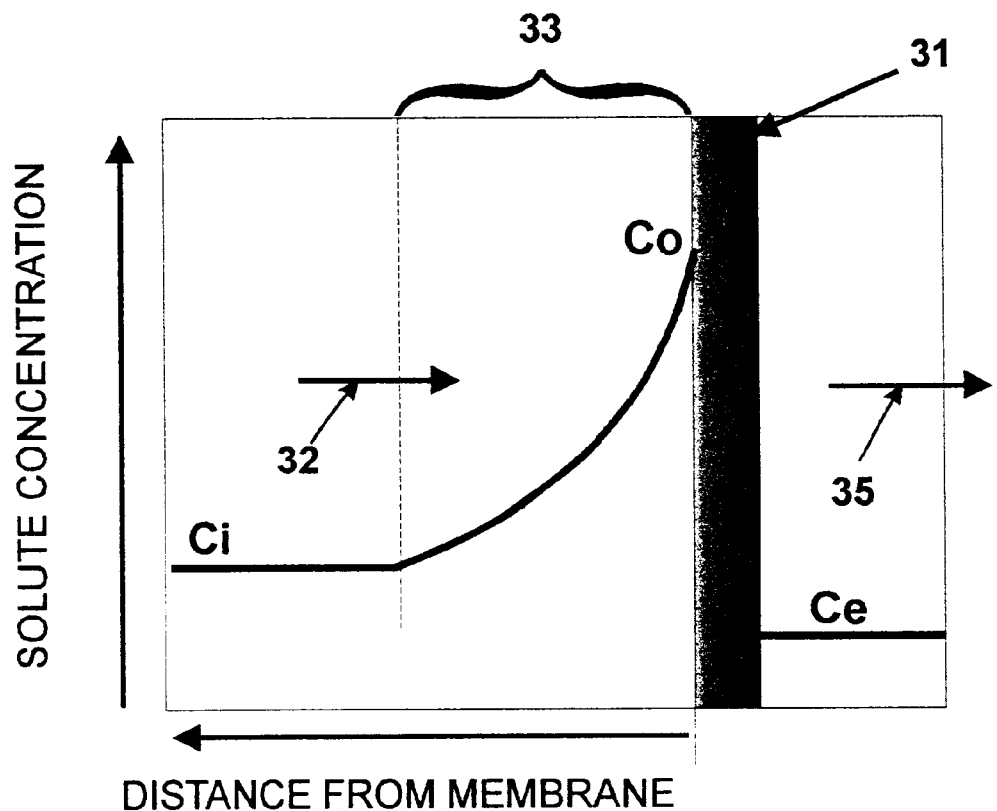
FIG. 4 illustrates the concentration and precipitation of solute in the membrane precipitator of FIG. 3.

The majority of the solution entering via the line 23, approximately 40%–60% of the total flow, again exits the cross-flow reverse osmosis unit 24 as the waste stream 27. This waste stream 27 is then conveyed via the line 29 to a membrane precipitator unit 30, which as shown in FIG. 3 includes a membrane 31 which is made, for example, of natural or synthetic material. The membrane 31 is disposed at that end of the membrane precipitator 30 that is downstream of where the solution enters. Details of the solute concentration behavior within the membrane precipitator unit 30 can be seen from FIG. 4, which is a graphical representation of solute concentration (assuming no precipitation) plotted against the distance from the membrane 31. The solute is concentrated to saturation or supersaturation in the membrane precipitator unit 30, and precipitation or crystallization results. In particular, as can be seen from FIG. 4, flow of solution is directed through the membrane 31 of the membrane precipitator 30 in the direction of the arrow 32. The solution enters the membrane precipitator 30 at an initial solute concentration of $C_i$. Some or all of the solute is retained by the membrane 31 while the solvent passes through the membrane. As a consequence, the concentration of the solute increases across the zone 33 on the upstream side of the membrane 31. Within the zone 33, the solute concentration reaches saturation or supersaturation and precipitation occurs. In particular, the solute concentration increases across the zone 33 from the input concentration $C_i$ to a maximum concentration $C_o$ at the upstream face of the membrane 31. The solute concentration $C_e$ of the effluent stream 35 exiting the membrane 31 is therefore less than the input concentration $C_i$ due to the precipitation of solute within the membrane precipitator unit 30. To aid in the settling out of the precipitate within the membrane precipitator unit 30, solution input into the membrane precipitator can be directed upwardly through the unit, so that the precipitate settles away from the membrane and collects at the base of the membrane precipitator 30. It should be noted that flow of solution through the membrane precipitator 30 is perpendicular or nearly perpendicular to the surface of the membrane 31.

As indicated in FIG. 1 by the dashed line arrow 36, the precipitate that collects in the membrane precipitator 30 must be removed. This can occur either continuously or periodically, either while the system is operating or during periodic shutdown of the system. Any suitable removal means can be used.

As indicated above, the concentration of solute in the effluent stream 35 (FIGS. 3 and 4) is less than that of the solution entering the membrane precipitator unit 30. Again, this decrease in solute concentration or contaminant can be controlled by the appropriate selection of the membrane 31, by controlling the rate of flow through the system, and by controlling the removal of precipitate from the membrane precipitator unit 30. If the purity of the solvent leaving the membrane precipitator 30 via the effluent stream 35 has achieved the desired level, the solvent can be withdrawn for disposal as a waste stream or for reuse directly via the line 37, which can contain a shutoff valve 38. However, if the desired level of purity has not yet been achieved, the effluent stream 35 can be recirculated via the line 40, which similarly contains a shutoff valve 41, back to the cross-flow membrane unit 24. In addition, in order to better be able to control flow through the system, an optional bypass line 42 containing the valve 43 can also be provided in order to bypass a partial stream of solution around the membrane precipitator unit 30.

Although only a single cross-flow membrane unit 24 and a single membrane precipitator unit 30 have been illustrated, it is to be understood that several such units, either in series or in parallel or in various combinations thereof, could be provided.

In addition, in the embodiment of FIG. 1, no specific provision was made for the selective separation and/or precipitation of the various solutes that may be contained in a solution that is being processed by the inventive system. However, it has also been found according to the teachings of this invention that selective separation of either specific individual solutes or groups of solutes is possible. For example, reference is now made to FIG. 5, wherein another solvent purification system of this invention is generally indicated by the reference number 20A and parts thereof similar to the solvent purification system 20 of FIG. 1 are indicated by like reference numerals followed by the reference letter "A".

Figure 5:
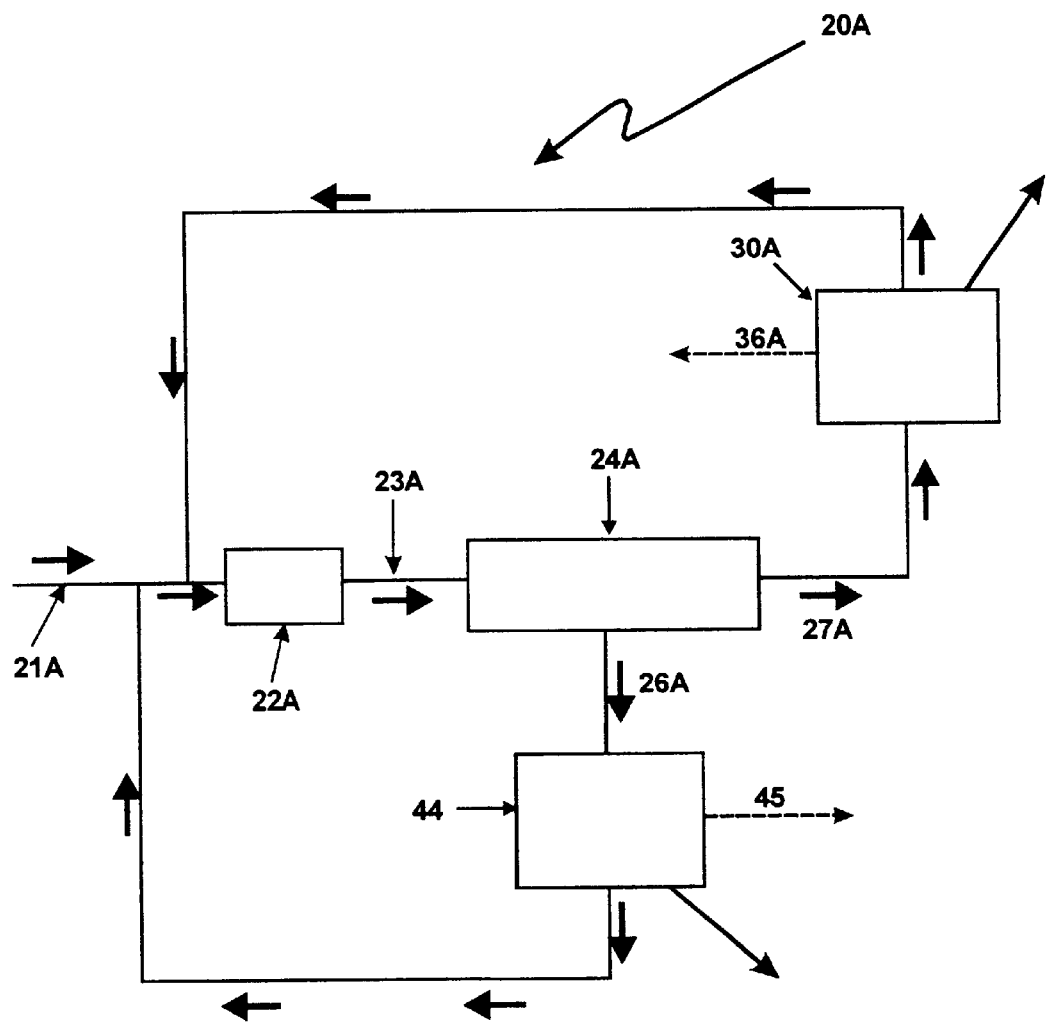
FIG. 5 shows a further exemplary embodiment of the solvent purification system of the present invention.

In the embodiment of the solvent purification system 20A illustrated in FIG. 5, two membrane precipitator units are provided, namely the membrane precipitator 30A that receives the waste stream 27A from the cross-flow membrane unit 24A, and a further membrane precipitator unit 44 that receives the permeate or "purified" solvent stream 26A from the reverse osmosis unit 24A. In this embodiment, the perm selective or solute-selective membrane of the cross-flow reverse osmosis unit 24A allows one or more solutes to pass through while rejecting or preventing the passage of other solutes. As a result, different solutes are precipitated in each of the membrane precipitator units 30A and 44. This allows the present invention to be utilized for producing purified solids or precipitates even where a plurality of solutes were contained in the incoming solution. The solute or solutes precipitated in the membrane precipitator unit 30A are removed at the arrow 36A, while the solute or solutes precipitated in the membrane precipitator unit 44 are removed at the arrow 45. As discussed in conjunction with the embodiment of FIG. 1, the effluent streams exiting the respective membrane precipitator units can be withdrawn or recirculated as appropriate until the desired level of solute or contaminant removal has been achieved. Again, various combinations of cross-flow membrane units and membrane precipitator units could be provided.

Figure 6:
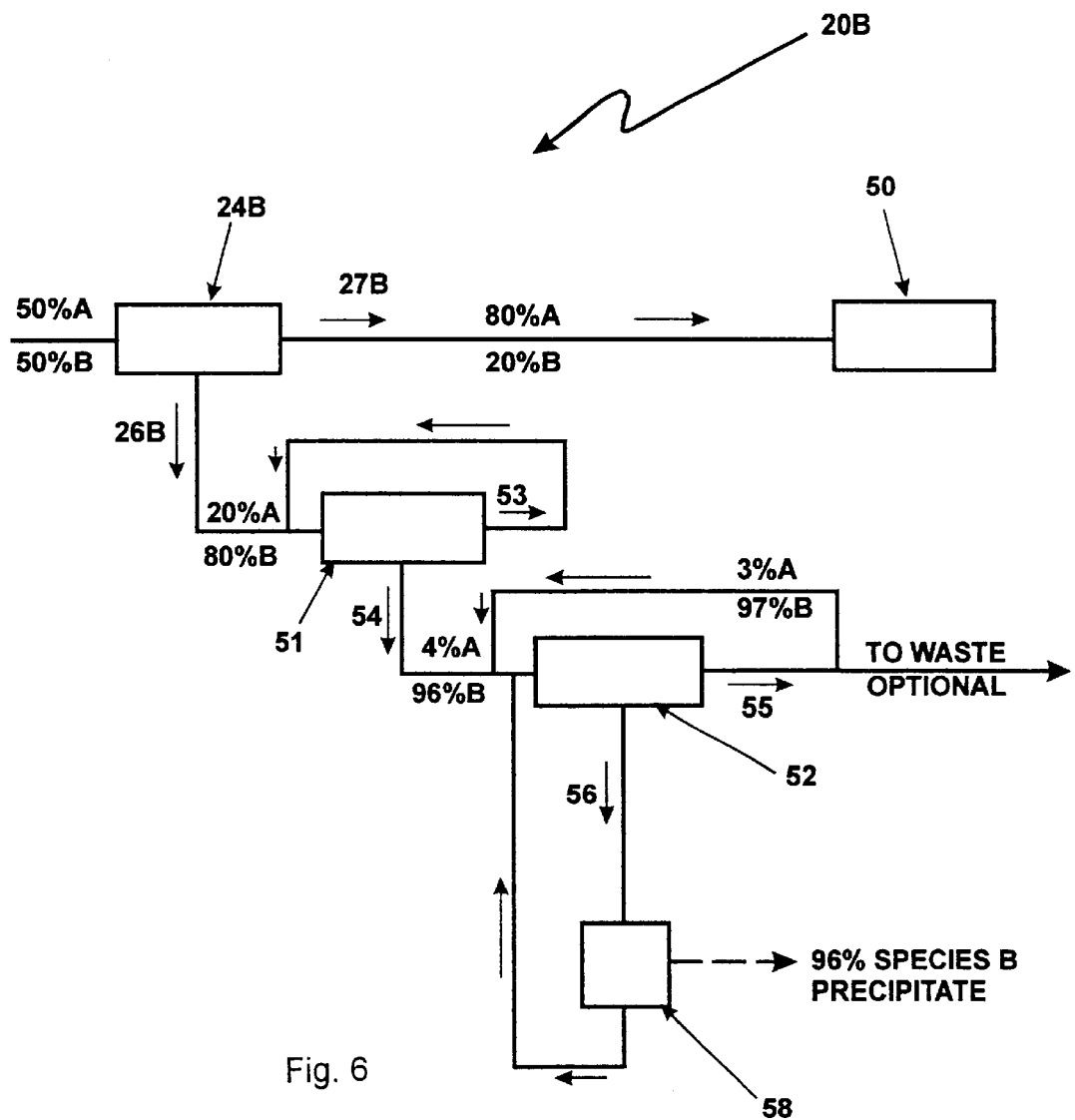
FIG. 6 shows yet another exemplary embodiment of the inventive solvent purification system.

Another specific embodiment of selective precipitation of solutes is shown in the solvent purification system 20B illustrated in FIG. 6. In this embodiment, the waste stream from the cross-flow reverse osmosis unit 24B or at least part of such waste stream, can be conveyed to one or more further cross-flow membrane units 50 prior to being conveyed to one or more membrane precipitator units, whereupon the effluent stream can be discharged or recirculated. Part of the waste stream of the unit 24B could also be conveyed directly to a membrane precipitator. The solvent stream or permeate 26B is also conveyed to one or more further cross-flow membrane units, with two such units 51 and 52 being illustrated. The waste steam 53 from the cross-flow membrane unit 51 is recirculated, while the solvent stream or permeate 54 from the unit 51 is conveyed to the further cross-flow membrane unit 52. The waste stream 55 from the unit 52 can be recirculated, can be discharged, or can be conveyed to one or more membrane precipitator units. The recirculating stream from the cross-flow membrane unit 52 can be partially diverted to the cross-flow membrane unit 51. The solvent stream or permeate 56 from the cross-flow membrane unit 52 is conveyed to a membrane precipitator unit 58, with the effluent stream from the unit 58 being discharged or being recirculated to the cross-flow membrane unit 52.

In one specific example utilizing the solvent purification system 20B, the solution entering the cross-flow reverse osmosis unit 24B contains 50% of solute A, which comprises one or more solutes, and 50% of solute B, which contains one or other solutes.

By appropriate selection of the membrane of the cross-flow reverse osmosis unit 24B, the waste stream 27B thereof could contain 80% solute A and 20% solute B, while the solvent stream 26B from the unit 24B could contain 20% solute A and 80% solute B. The solute A in the waste stream 27B can be concentrated further as desired. In the further cross-flow membrane unit 51, the solvent stream 54 contains 4% solute A and 96% solute B. Solute B can be further concentrated in the further cross-flow membrane unit 52, wherein for example the waste stream 55 contains 3% solute A and 97% solute B, whereas the solvent stream 56 from the unit 52 is conveyed to the membrane precipitator unit 58, where 96% pure solute B can be precipitated and removed.

The solvent purification systems 20A and 20B shown in FIGS. 5 and 6 can, of course, also be provided with appropriate valves and bypass lines to regulate and balance the various solution flows.

As indicted previously, the membranes of the membrane precipitator units can be made of synthetic, natural, or treated natural material. Membranes made of clay, such as smectite, have shown great promise and are capable of precipitating highly soluble dissolved solids (solutes).

The present invention is, of course, in no way restricted to the specific disclosure of the specification and drawings, but also encompasses any modifications within the scope of the appended claims.

What is claim is:

1. A method of reducing the solute concentration in solvents, including the steps of:
   directing a flow of solute-containing solvent, under pressure, across at least one cross-flow membrane unit to generate a solvent stream through a membrane of said unit and to generate a waste stream across said membrane; and
   conveying said waste stream from said at least one cross-flow membrane unit through a membrane of at least one membrane precipitator unit to concentrate said solute on an upstream side of said membrane to thereby cause precipitation ion of dissolved solutes and generate ion of an effluent stream.

2. A method according to claim 1, which includes the steps of recirculating at least some of said effluent stream back to said at least one cross-flow membrane unit, and repeating said recirculating step until a desired level of solute reduction is achieved.

3. A method according to claim 1, which includes the step of at least periodically removing said precipitated-out solute from said at least one membrane precipitator unit.

4. A method according to claim 1, wherein said solvent is water.

5. A method according to claim 1, wherein said directing step comprises directing said flow at up to 10,000 psi across said cross-flow membrane unit.

6. A method according to claim 1, wherein said cross-flow membrane unit is selected from the group consisting of reverse osmosis, electrodialysis, and ultrafiltration units.

7. A method according to claim 1, wherein said membrane precipitator unit includes a membrane selected from the group consisting of natural membranes, treated natural membranes, and synthetic membranes.

8. A method according to claim 1, wherein said directing step comprises directing said flow across a first cross-flow membrane unit, and which includes the further step of conveying said solvent stream from first said cross-flow membrane unit through at least one other membrane precipitator unit.

9. A method according to claim 1, which includes the further steps of conveying said solvent stream from said at least one cross-flow membrane unit across a further cross-flow membrane unit, and repeating this process until a desired purity of the solvent is achieved.

10. A method according to claim 9, which includes the step of conveying a solvent stream from said further cross-flow membrane through at least one other membrane precipitator unit.

11. A method according to claim 10, which includes the step of conveying a waste stream from said further cross-flow membrane unit through at least one further membrane precipitator unit.

12. A solute concentration and precipitation system, comprising;
    at least one cross-flow membrane unit for receiving across it, under pressure, a flow of solute-containing solvent; and
    at least one membrane precipitator unit for receiving through lit membrane thereof a waste stream from said at least one cross-flow membrane unit, said membrane effecting solute concentration on an upstream side thereof to thereby cause precipitation of solute.

13. A system according to claim 12, which includes means to recirculate at least part of an effluent stream from said at least one membrane precipitator unit back to said at least one cross-flow membrane unit.

14. A system according to claim 12, which comprises means to continuously or periodically remove precipitated-out solute from said at least one membrane precipitator unit.

15. A system according to claim 12, which includes means for directing said flow of solute-containing solvent across said cross-flow membrane unit at up to 10,000 psi.

16. A system according to claim 12, wherein said cross-flow membrane unit is selected from the group consisting of reverse osmosis, electrodialysis, and ultrafiltration units.

17. A system according to claim 12, wherein said membrane precipitator unit includes a membrane selected from the group consisting of natural membranes, treated natural membranes, and synthetic membranes.

18. A system according to claim 12, which includes a first cross-flow membrane unit and at least one other membrane precipitator unit to receive a solvent stream from said first cross-flow membrane unit.

19. A system according to claim 12, which includes at least one further cross-flow membrane unit for receiving a solvent stream from said at least one cross-flow membrane unit.

20. A system according to claim 19, which includes at least one further membrane precipitator unit for receiving a solvent stream from at least one of said further cross-flow membrane units.

* * * * *